(12) United States Patent
Christian et al.

(10) Patent No.: US 6,620,550 B2
(45) Date of Patent: Sep. 16, 2003

(54) BATTERY CATHODE AND METHOD OF MANUFACTURE THEREFOR

(75) Inventors: Paul A. Christian, Norton, MA (US); Ou Mao, New Milford, CT (US); Shuming Zeng, Brookfield, CT (US)

(73) Assignee: The Gillette Company, Boston, MA (US)

( * ) Notice: Subject to any disclaimer, the term of this patent is extended or adjusted under 35 U.S.C. 154(b) by 218 days.

(21) Appl. No.: 09/768,138

(22) Filed: Jan. 23, 2001

(65) Prior Publication Data

US 2002/0134964 A1 Sep. 26, 2002

(51) Int. Cl.[7] .............................................. H01M 4/50
(52) U.S. Cl. ...................................... 429/224; 429/232
(58) Field of Search ................................ 429/224, 232, 429/231.1

(56) References Cited

U.S. PATENT DOCUMENTS

| | | | |
|---|---|---|---|
| 4,563,404 A | | 1/1986 | Bahary |
| 5,277,890 A | | 1/1994 | Wang et al. |
| 5,340,666 A | * | 8/1994 | Tomantschger et al. .... 429/165 |
| 5,391,365 A | * | 2/1995 | Wang et al. .................. 423/50 |
| 5,401,590 A | | 3/1995 | Chalilpoyil |
| 5,478,705 A | | 12/1995 | Czekai et al. |
| 5,482,798 A | * | 1/1996 | Mototani et al. ........... 429/224 |
| 5,500,331 A | | 3/1996 | Czekai et al. |
| 5,766,789 A | | 6/1998 | James et al. |
| 5,938,798 A | * | 8/1999 | Hanawa et al. ............ 29/623.1 |
| 6,037,019 A | | 3/2000 | Kooyer et al. |
| 6,162,561 A | | 12/2000 | Wang et al. |

FOREIGN PATENT DOCUMENTS

| | | |
|---|---|---|
| EP | 0170411 | 2/1986 |
| WO | WO 93/08123 | 4/1993 |

OTHER PUBLICATIONS

Perry's Chemical Engineers' Handbook, Seventh Edition, Don W, Green, editor (1997) pp. 20–31 to 20–39.*

* cited by examiner

*Primary Examiner*—Carol Chaney
(74) *Attorney, Agent, or Firm*—Barry D. Josephs; Paul I. Douglas; Thomas G. Krivulka

(57) ABSTRACT

The invention provides an improved method for preparing homogeneous intermixtures of particulate manganese dioxide and conductive carbon for use in cathodes for electrochemical cells, in particular alkaline primary cells. Homogeneous intermixtures can be prepared by mechanically activating an essentially dry admixture of particulate electrolytic manganese dioxide and a natural graphite, an expanded graphite or combinations thereof with inert, rigid milling media by the agitation process of the invention. Improved cell discharge performance at both low and high rates of discharge can be achieved for extremely low levels of highly expanded graphite, typically between about 1 and 5 wt %.

39 Claims, 7 Drawing Sheets

FIG. 3.1
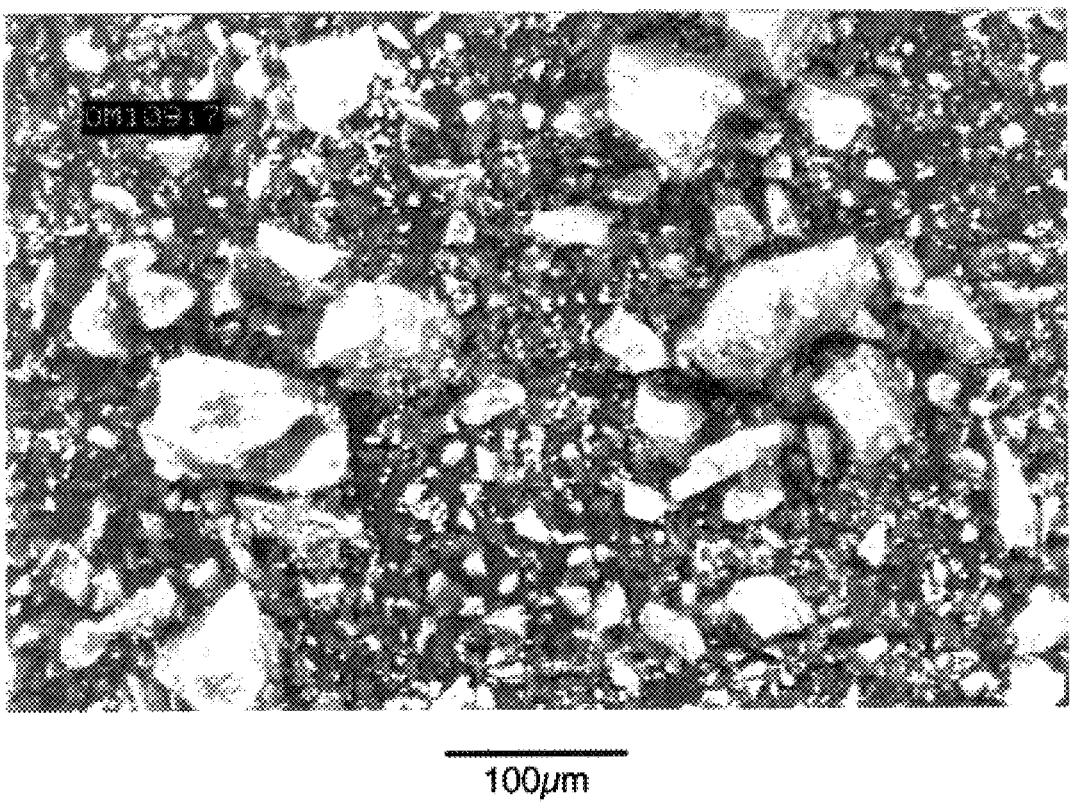
100μm

FIG. 3.2
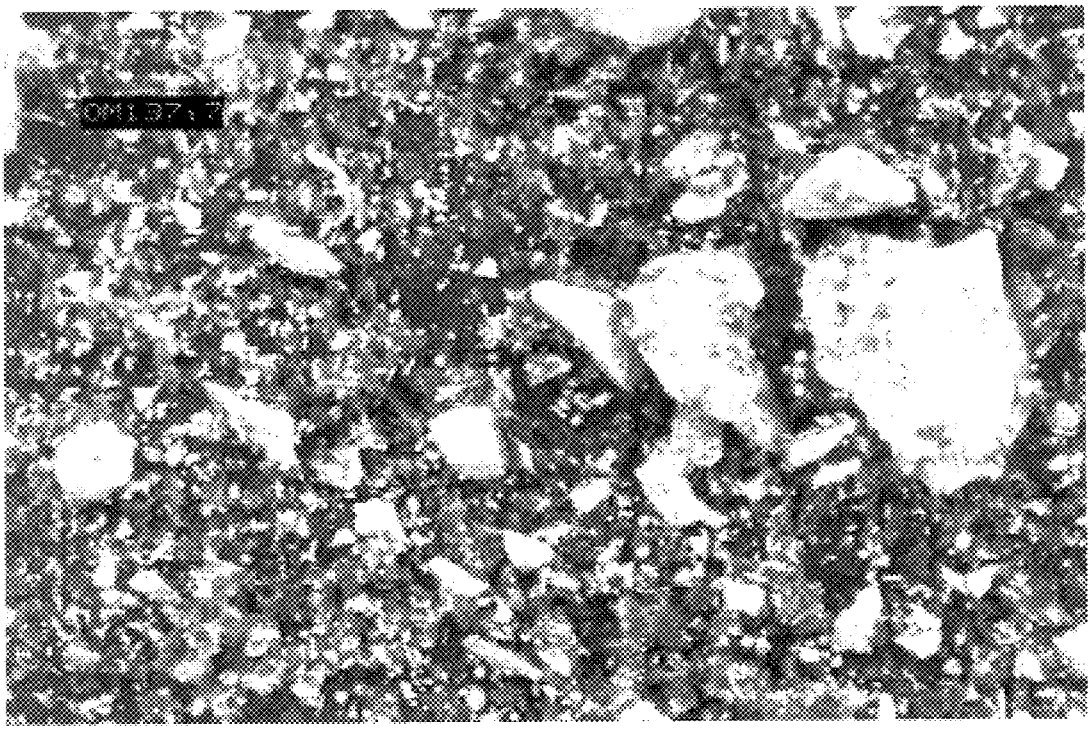
100μm

FIG. 3.3
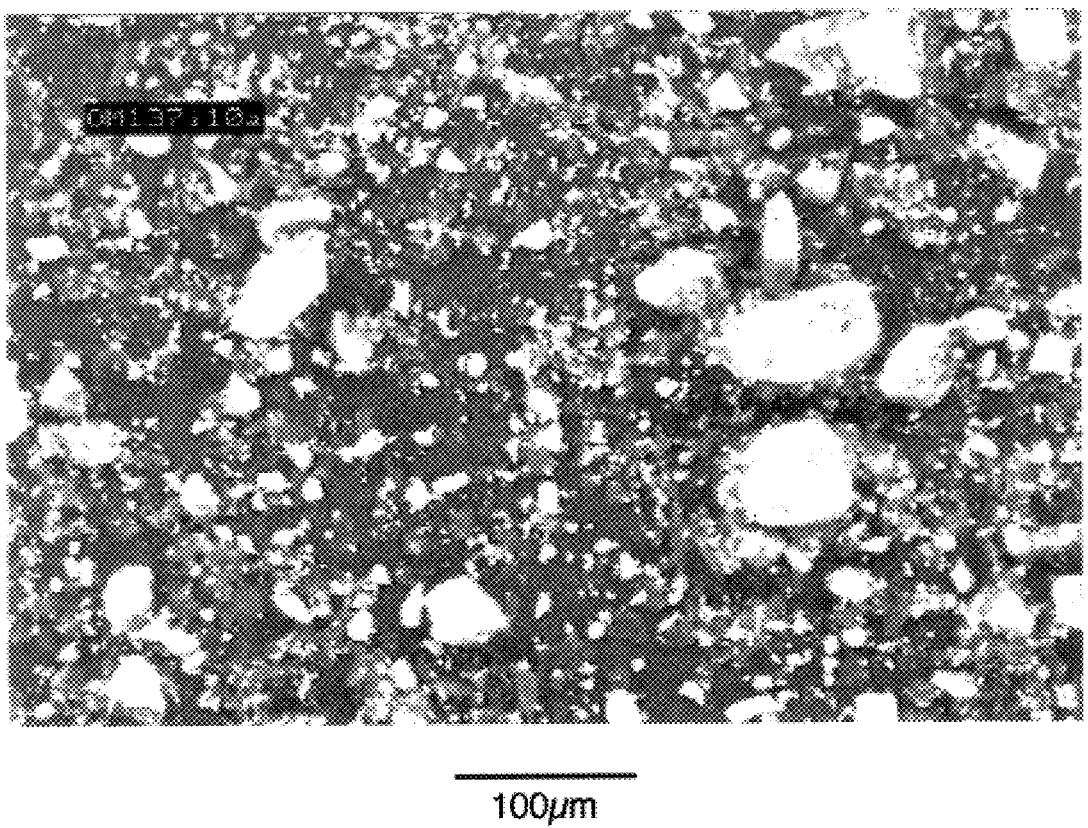
100μm

FIG. 3.4
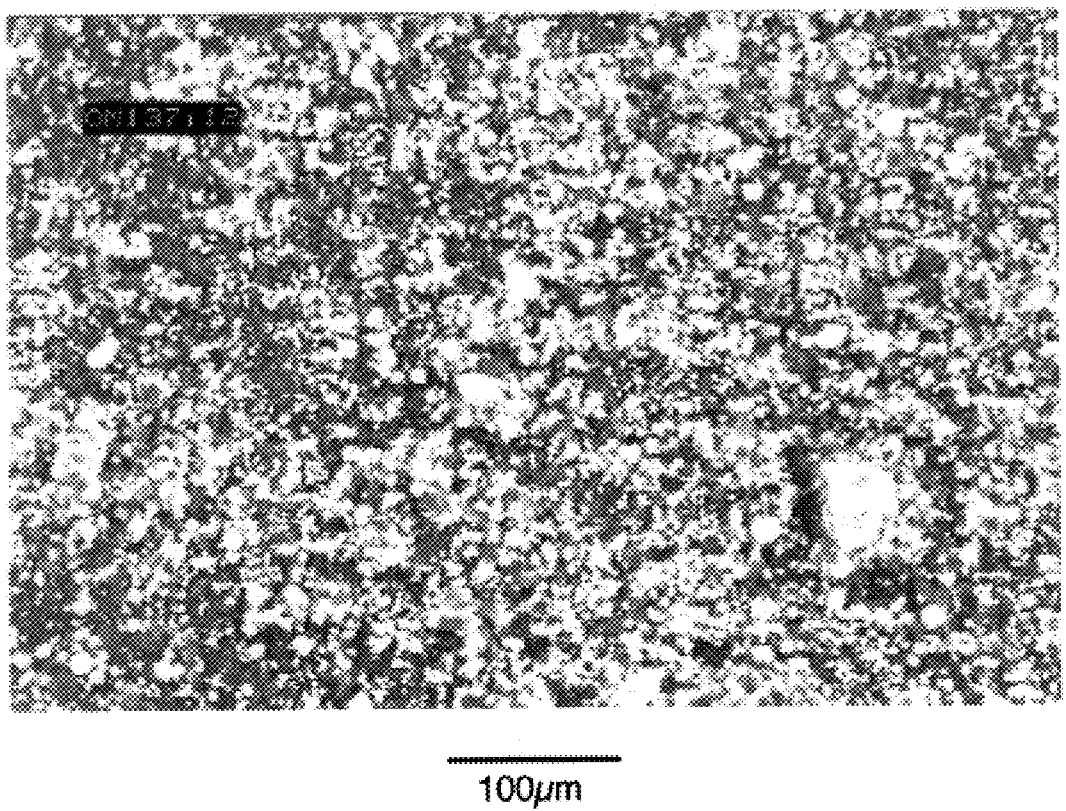
100μm

BATTERY CATHODE AND METHOD OF MANUFACTURE THEREFOR

FIELD OF THE INVENTION

This invention relates to a method for manufacturing an electrically conductive electrode for use in batteries. The invention also relates to the application of said electrode as the cathode in a primary alkaline battery.

BACKGROUND OF THE INVENTION

Primary alkaline electrochemical cells typically include a zinc anode active material, an alkaline electrolyte, a manganese dioxide cathode active material, and an electrolyte permeable separator film, typically of cellulosic and synthetic fibers. The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector. The electrolyte can be an aqueous solution of an alkali metal hydroxide for example, potassium hydroxide, sodium hydroxide or lithium hydroxide. The cathode typically includes manganese dioxide as the electrochemically active material admixed with an electrically conductive additive to enhance electrical conductivity, an optional polymeric binder, and other optional additives, such as titanium-containing compounds including anatase-type titanium dioxide and other alkaline earth metal titanates. Because manganese dioxide typically exhibits relatively low electrical conductivity, an electrically conductive additive is needed to improve the electrical conductivity between individual manganese dioxide particles and also between the manganese dioxide particles and the steel container that encloses the cell components and that also serves as cathode current collector. Suitable electrically conductive additives can include, for example, conductive carbon powders, such as carbon blacks, including acetylene blacks, natural graphites, synthetic graphites, including expanded or exfoliated graphites, and combinations thereof.

It is desirable for a primary alkaline battery to have a high discharge capacity (i.e., long service life). Since commercial cell sizes have been fixed, it is known that the performance and/or useful service life of a cell can be enhanced by increasing the interfacial surface area of the electrode active materials as well as by packing greater amounts of the electrode active materials into the cell. However, these approaches have practical limitations such as, for example, if the electrode active material is packed too densely in the cell, the rates of electrochemical reactions during cell discharge can be reduced, in turn reducing service life. Other deleterious effects such as cell polarization can occur as well. Polarization limits the mobility of ions within both the electrolyte and the electrodes, which in turn degrades cell performance and service life. Although the amount of active material included in the cathode typically can be increased by decreasing the amount of non-electrochemically active materials such as polymeric binder or conductive additive, a sufficient quantity of conductive additive must be maintained to ensure an adequate level of bulk conductivity in the cathode. Thus, the total active cathode material is effectively limited by the amount of conductive additive required to provide an adequate level of conductivity.

Further, it is highly desirable to enhance the performance of an alkaline cell at high rates of discharge. Typically, this is accomplished by increasing the volume fraction of conductive additive in the cathode in order to increase overall (viz., bulk) electrical conductivity of the cathode. The volume fraction of conductive additive within the cathode must be sufficient to form a suitable percolative network of conductive particles. Typically, when the conductive additive is a conductive carbon, about 5 to 15 weight percent of the total mixture is required. However, an increase in the amount of conductive carbon produces a corresponding decrease in the amount of active cathode material, giving lower service life. Conventional powdery conductive carbons such as acetylene black and flaky, crystalline natural or synthetic graphites have intrinsic drawbacks including low packing density, high electrolyte absorption, and high levels of impurities that can lead to excessive hydrogen gassing by the cell.

It is well known to use a specific type of graphite called expanded graphite in place of conventional powdery conductive carbons in battery cathodes. As used herein, expanded graphite comprises natural or synthetic graphite in which the crystal lattice has been uniaxially expanded or exfoliated. Various methods can be employed to form expanded graphite including, for example, the incorporation of a strong acid such as sulfuric, nitric, or chromic acid or mixtures thereof and a strong oxidant such as hydrogen peroxoide, perchloric acid, iodic or periodic acid, perchloric acid salts, permanganate salts, and the like followed by a rapid high temperature treatment as disclosed, for example, in U.S. Pat. Nos. 1,137,373; 1,191,383; 3,404,061; and Japanese Unexamined Patent Application (Kokai) No. 16406/1994. Following the heat-treatment, the expanded graphite typically is washed, compacted, and milled by attrition to produce the desired average particle sizes. After milling, expanded graphite particles typically exhibit reduced thickness in the direction of the graphite crystallographic c-axis. Since decreased particle thickness results in an increase in the number of conductive graphite particles per unit weight, a specific weight fraction of expanded graphite can impart a higher degree of conductivity in a cathode than the same amount of a non-expanded graphite. When admixed with manganese dioxide to form a cathode, less expanded graphite can be used resulting in increased service life. In addition, as disclosed in U.S. Pat. No. 5,482,798, expanded graphite has a flaky particle morphology, high compressibility, high lubricity, and good moldability thereby facilitating cathode fabrication.

The use of expanded graphite as a conductive additive in cathodes of conventional alkaline primary cells is known and disclosed for example, in U.S. Pat. No. 5,482,798; PCT publication no. WO 93/08123; European Application EP 0170,411; and also in Japanese Unexamined Patent Applications (Kokai) JP56-128579 and JP56-118267. A suitable expanded graphite having an average particle size ranging from 0.5 to 15 microns, preferably from 2 to 6 microns is disclosed in the '798 patent. The smaller average particle size of expanded graphite relative to conventional natural or synthetic crystalline graphite (e.g., 15 to 30 microns) was hypothesized to facilitate the formation of a conductive network typically at a lower volume fraction of graphite. An expanded graphite having an average particle size greater than about 30 microns was disclosed to provide no performance advantage in alkaline cells compared to a conventional non-expanded natural graphite having a comparable particle size. The '798 patent also disclosed that suitable amounts of expanded graphite can range from about 2 to 8 weight percent, and preferably from about 3 to 6 weight percent of the total cathode. Further, for expanded graphite contents of greater than about 10 weight percent no performance advantage is provided relative to equivalent amounts of unexpanded graphite particles in alkaline primary cells.

Various methods for preparing mixtures of manganese dioxide and graphite are known to provide suitable levels of electrical conductivity in cathodes of alkaline cells. Typically, graphite can be mixed dry with manganese dioxide using any of a variety of conventional blending, mixing or milling equipment. For example, U.S. Pat. No. 5,938,798 discloses the use of a twin cylinder mixer or a rotary tumbling mixer to dry mix graphite and manganese dioxide. In a subsequent step disclosed in the cited '798 patent, the formed mixture was wet-pulverized, preferably in water, using a horizontal media mill such as a ball mill or bead mill to decrease average manganese dioxide particle size to less than 10 microns. Excessive pulverization of either the mixture of graphite and manganese dioxide or manganese dioxide in the absence of graphite was disclosed to result in degraded cell discharge performance. It was further disclosed that graphite can function as a lubricant during the pulverization process thereby permitting reduction of manganese dioxide particle size without degradation of electrochemical properties.

Manganese dioxides suitable for use in alkaline cells include both chemically produced manganese dioxide known as "chemical manganese dioxide" commonly referenced in the art as "CMD" and electrochemically produced manganese dioxide known as "electrolytic manganese dioxide" commonly referenced as "EMD". CMD can be produced economically and in high purity, for example, by the methods described by Welsh et al. in U.S. Pat. No. 2,956,860. EMD is manufactured commercially by the direct electrolysis of a bath containing manganese sulfate dissolved in a sulfuric acid solution. Manganese dioxide produced by electrodeposition typically has high purity and high density. Processes for the manufacture of EMD and representative properties thereof are described in "Batteries", edited by Karl V. Kordesch, Marcel Dekker, Inc., New York, Vol. 1, 1974, pp.433–488. EMD is the preferred type of manganese dioxide for use in alkaline cells. One consequence of the electrodeposition process is that the EMD typically retains a high level of surface acidity from the sulfuric acid of the electrolysis bath. This residual surface acidity can be neutralized for example, by treatment with an aqueous base solution. Suitable aqueous bases include: sodium hydroxide, ammonium hydroxide (i.e., aqueous ammonia), calcium hydroxide, magnesium hydroxide, potassium hydroxide, lithium hydroxide, and any combinations thereof. Typically, commercial EMD is neutralized with a strong base such as sodium hydroxide because it is both highly effective and economical.

Thus, even though considerable effort has been expended, as evidenced by the prior art cited hereinabove, the methods used to prepare cathodes containing EMD and graphite require additional refinement in order to improve substantially the discharge performance and service life of alkaline electrochemical cells.

SUMMARY OF THE INVENTION

It is a principal objective of the present invention to produce an improved cathode comprising manganese dioxide and an electrically conductive carbon that provides an improvement in discharge performance and service life of alkaline electrochemical cells when included therein.

An aspect of the present invention is directed to producing an alkaline primary cell having increased service life as well as improved discharge performance at high rate of discharge by increasing the volume fraction of electrochemically active material within the cathode. Because the overall dimensions of commercial alkaline cells are fixed, the internal volume available for the component materials is also fixed. In order to increase the total amount of active cathode material, the volume fraction of electrochemically-inactive components must be decreased. The present invention provides for decreasing the amounts of non-electrochemically active components in the cathode, including for example polymeric binders and conductive additives, while preserving the overall level of electrical conductivity and mechanical integrity of the cathode.

The present invention also provides a conductive cathode consisting of predominantly manganese dioxide admixed with a small amount of an electrically conductive carbon wherein the carbon functions both as a conductive additive and a binder. The conductive carbon can be selected from acetylene black, natural or synthetic flaky, crystalline graphite, expanded graphite prepared from a natural or synthetic graphite precursor, graphitized carbon fibers, including carbon nanofibers, nanotubules or fibrils and combinations thereof.

In an aspect of the process of the invention, cathodes suitable for alkaline electrochemical cells can be formed by mechanically agitating an essentially dry admixture of particulate manganese dioxide and conductive carbon with inert, rigid milling media, separating the milling media from the mixture, and optionally adding aqueous electrolyte to the mixture to facilitate cathode fabrication. Suitable conductive carbon particles can include, for example, acetylene blacks, natural crystalline or synthetic crystalline flaky graphites, expanded graphites (which can also be in exfoliated form), graphitized carbon fibers, including carbon nanofibers, nanotubules or fibrils or any mixture thereof.

Another aspect of the present invention provides a high-efficiency mixing or blending process whereby manganese dioxide and conductive carbon particles can be sufficiently intermixed such that the volume fraction of conductive carbon can be minimized and the volume fraction of manganese dioxide can be maximized in the cathode while maintaining a suitable level of electrical conductivity. At low volume fractions of conductive carbon, the conductivity of the cathode depends strongly on the efficiency of percolative network formation by the conductive carbon particles, which in turn depends on the average particle sizes and particle size distributions, as well as the relative sizes of the manganese dioxide and conductive carbon particles, the particle morphologies, the specific conductivity of the conductive carbon particles, and especially, the homogeneity of the intermixing of the conductive carbon and manganese dioxide particles.

Still another aspect of the present invention includes the mixing process whereby manganese dioxide and conductive carbon particles can be sufficiently intermixed in the dry state, that is, without the addition of liquids or solvents to form slurries or dispersions thereof. The mechanical mixing process of the invention provides a simplification of the typical cathode manufacturing process whereby the final steps of separating the mixture of manganese dioxide and conductive carbon from an added liquid or solvent and drying of the mixture can be eliminated. Further, the dry mixing process of the invention advantageously minimizes degradation of cell discharge performance resulting from attrition of the manganese dioxide particles during mixing by conventional wet-milling processes.

BRIEF DESCRIPTION OF THE DRAWINGS

FIG. 3.1 depicts a SEM micrograph at nominally 200× magnification of a dry cathode mixture comprising 95 wt % EMD and 5 wt % natural graphite blended in a conventional high-speed laboratory blade mill for 2 minutes.

FIG. 3.2 depicts a SEM micrograph at nominally 200× magnification of a dry cathode mixture comprising 95 wt % EMD and 5 wt % natural graphite mechanically agitated in a Turbula mixer with ceramic milling media for 3 minutes in accordance with the process of the invention.

FIG. 3.3 depicts a SEM micrograph at nominally 200× magnification of a dry cathode mixture comprising 95 wt % EMD and 5 wt % natural graphite mechanically agitated in a Turbula mixer with ceramic milling media for 1 hour in accordance with the process of the invention.

FIG. 3.4 depicts a SEM micrograph at nominally 200× magnification of a dry cathode mixture comprising 95 wt % EMD and 5 wt % natural graphite mechanically agitated in a Turbula mixer with ceramic milling media for 5 hours in accordance with the process of the invention.

DETAILED DESCRIPTION OF THE INVENTION

Figure 1:
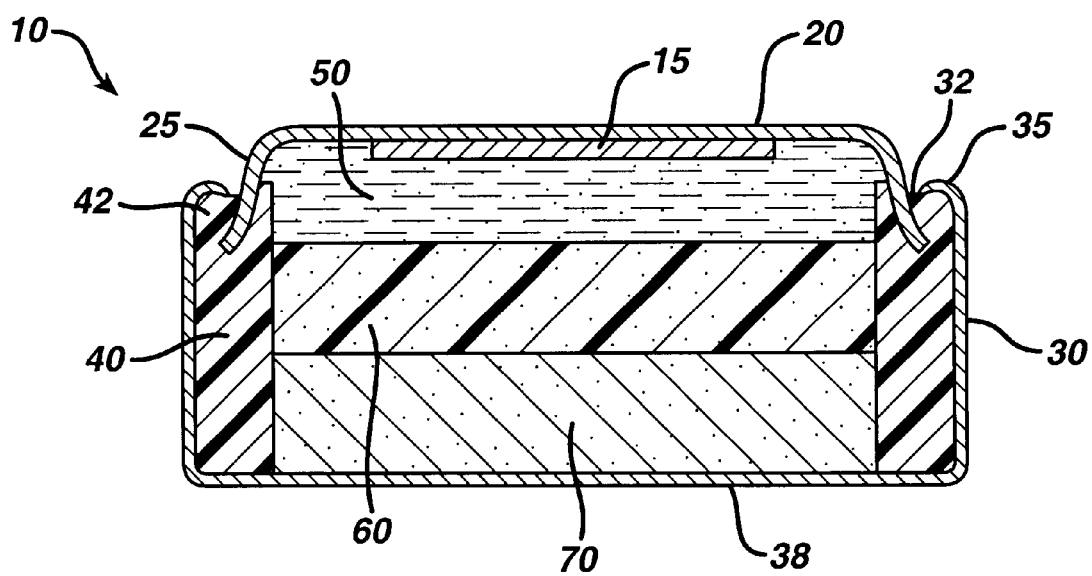
FIG. 1 is a drawing depicting an alkaline primary coin or button-type cell.

The present invention features an improved method for preparing a conductive battery cathode comprising manganese dioxide and a minimal amount of an electrically-conductive additive homogeneously intermixed to form an electrically-conductive matrix suitable for use in an alkaline primary cell. The method of the invention is particularly suitable for intermixing an admixture of manganese dioxide and conductive carbon particles by a mechanical agitation process including the use of rigid, inert milling media therein. Suitable manganese dioxides include: $\gamma$-$MnO_2$, $\epsilon$-$MnO_2$, EMD and CMD. Suitable manganese dioxides also include EMD and CMD alone or in admixture that have been treated by contact with ozone gas by the method of U.S. Pat. No. 6,162,561, and p-CMD prepared by the method of U.S. Pat. No. 5,277,890. Commercial grade EMD powders having sodium contents less than 500 ppm and average (mean) particle sizes between about 40 and 50 microns are preferred. The term "average particle size" as used herein with reference to manganese dioxide and conductive carbon particles refers to the mean particle size, typically the most common average particle size reported for such substances. An "effective" particle size can be specified as the longest dimension of the particle. Thus, the effective particle size of a spherical particle is its diameter and that of an elongated particle is its length. Suitable electrically conductive additives include conductive carbons, such as acetylene blacks, natural and synthetic flaky, crystalline graphites, expanded or exfoliated graphites, graphitized carbon fibers, including carbon nanofibers, nanotubules or fibrils and any combinations thereof. Thus, cathodes suitable for use in alkaline electrochemical cells can be formed from dry mixtures containing manganese dioxide and conductive carbon particles homogeneously intermixed by mechanical agitation with inert, rigid milling media, and separating out the milling media prior to fabrication of the cathodes.

Typically, natural and synthetic crystalline graphites can have average particle sizes ranging from about 2 to 50 microns. A suitable flaky natural crystalline graphite having an average particle size of about 12 to 15 microns is commercially available under the tradename "MP-0702X" or "NdG-15" from Naçional de Grafite. Suitable expanded graphites typically have average particle sizes ranging from 0.5 to 40 microns. As described hereinabove, expanded graphite can be natural graphite or synthetic graphite wherein the graphite crystal lattice has been uniaxially expanded. Expanded graphite particles are characteristically much thinner than natural graphite particles in c-axis crystalline dimension and thus can exhibit a much higher aspect ratio (i.e., ratio of particle thickness to diameter). Because of the small average particle size and high aspect ratio of expanded graphite relative to flaky natural or synthetic graphites, expanded graphite can provide an increase in the number of points of contact between the graphite particles as well as with the manganese dioxide particles, which in turn provides enhanced conductivity in cathodes formed from mixtures thereof. Suitable expanded graphites are available commercially, for example, from Chuetsu Graphite, Timcal AG, and others.

Expanded graphite can be advantageously intermixed in various proportions with natural or synthetic flaky graphites and manganese dioxide to form ternary conductive mixtures suitable for use in cathodes of alkaline cells. Such mixtures including both expanded and natural graphite can exhibit intermediate physical and electrical properties relative to those mixtures containing only one type of graphite and manganese dioxide. In particular, replacement of a fraction of the natural or synthetic flaky graphite in a cathode by a suitable expanded graphite can provide a substantial increase in conductivity relative to that for cathodes containing non-expanded graphite only.

The term "natural crystalline graphite" as used herein shall mean graphite that is minimally processed, i.e., essentially in its geologically occurring natural crystalline form. The term "synthetic graphite" as used herein shall mean synthetically prepared or processed graphite. Synthetic graphite can have crystal structure and morphological properties that are the same or similar to natural graphite or can have a different structure. The term "synthetic graphite" as used herein unless further qualified is also intended to include various expanded forms of graphite (including expanded graphite that has been exfoliated). The term "expanded graphite" is a recognized term of art, for example, the form of graphite generally as referenced in U.S. Pat. No. 5,482,798. Further, expanded graphite as used herein can be formed from natural and/or synthetic non-expanded graphite processed so as to have a uniaxially expanded crystal lattice. The extent of uniaxial expansion can be sufficiently large such that the expanded graphite particles can completely exfoliate (i.e., separate into thin laminae). The term "flaky" as commonly used in connection with graphites, (i.e., natural or synthetic flaky graphites) is intended to reflect that such graphites have a plate-like, non-expanded particle form.

The mechanical activation process of the present invention involves forming an essentially dry powder mixture comprising manganese dioxide and a conductive carbon; combining the powder mixture with rigid, inert milling media; and subjecting the combination of powder mixture and inert milling media to a mechanical agitation process whereby manganese dioxide and carbon is mechanically activated producing an essentially homogeneous intermixture of manganese dioxide and conductive carbon particles. The use of rigid, inert milling media promotes more efficient intermixing of the manganese dioxide and conductive carbon particles than is possible using conventional dry mixing or blending processes. Further, the higher efficiency of mixing afforded by the dry mixing process of the present invention permits the use of substantially lower volume fractions of conductive carbon in the cathodes. The resulting decrease in volume fraction of conductive carbon permits introduction of additional manganese dioxide active material into the cathode thereby providing increased cell service life.

Cathodes mixtures prepared by the mechanical activation process of the invention result in improved alkaline cell service life, particularly at low discharge rates (e.g. less than 0.5 Watt, e.g. between about 1 and 500 milliamp drain). The improvement in service life in such an application can be obtained when cathodes are formed from mixtures of manganese dioxide and graphite treated by the mechanical activation process of this invention regardless of the total amount of graphite present for example, typically between about 1 and 10 weight percent, preferably between about 2 and 4 weight percent of the total cathode mixture. Comparable cell performance, particularly in high power applications (e.g. between about 0.5 and 2.0 Watt, more typically between about 0.5 and 1.5 Watt drain), can be achieved in an alkaline test cell with a lower total weight percentage of graphite in the cathode than a same-sized comparative cell, provided that the manganese dioxide and graphite mixture in the test cell is intermixed using the mechanical activation process of this invention. In such a comparison, the same types of graphite having the same weight ratio with respect to one another (viz., natural, synthetic, and expanded graphite) are used in the test cell as in the comparative cell, although the total weight percentage of graphite in the test cell is less than in the comparison cell.

Another beneficial result of the mechanical agitation process of the present invention is an apparent enhancement of the binder properties of the graphite, especially in the case of mixtures containing manganese dioxide and expanded graphite, thereby providing an increase in mechanical integrity and physical strength of the formed cathodes.

The term "mechanical activation" as used herein includes "mechanochemical activation", "mechanochemical synthesis", "mechanochemical processing", "reactive milling", and related processes. The term "mechanical activation", "mechanochemical activation", and in particular, "mechanochemical processing" as used herein is understood to include those processes whereby mechanical energy is used to activate, initiate or promote a chemical reaction, a crystal structure transformation, a change in chemical potential or a phase change in a material or a mixture of materials. The term "mechanical agitation" as used herein and in the claims with respect to the present invention shall be understood to mean agitating a reaction mixture in the presence of a milling media to transfer mechanical energy to the reaction mixture. The reaction mixture can be contained in a closed vessel or chamber. The term "agitating" or "agitation" as used herein shall include applying at least one or any combination of two or more of fundamental kinematic motions including translation (e.g., side-to-side shaking), rotation (e.g., spinning or rotating), and inversion (e.g., end-over-end tumbling) to the reaction mixture and milling media. Preferably, all three motions are imparted to the reaction mixture and milling media. Such agitation can be accomplished either with or without external stirring of the reaction mixture and milling media.

In the mechanical activation process of the present invention, the admixture of manganese dioxide and conductive carbon powders to be processed are combined in suitable proportions with inert milling media in a vessel or chamber that can be mechanically agitated (i.e., with or without stirring) for a predetermined period of time at a predetermined intensity of agitation. Typically, a milling apparatus is used to impart kinematic motion to the milling media by the external application of agitation, whereby various translational, rotational or inversion motions or combinations thereof are applied to the vessel or chamber and its contents, or by the internal application of agitation through a rotating shaft terminating in a blade, propeller, impeller or paddle or by a combination of both actions. Examples of processes that can be mechanically activated by the methods described herein include: physical intermixing of multi-component powders, initiation of chemical reactions, for example, solid state reactions such as metal alloy formation, oxidation/reduction reactions, ion-exchange reactions, substitution reactions, etc.; intercalation (and de-intercalation) reactions; dehydration reactions; formation of point, surface, and lattice defects in crystals; generation of dislocations in crystal lattices; initiation of polymorphic phase transformations; formation of metastable phases; refinement of crystallite size; amorphization of crystalline phases; and the like. Such processes can be promoted under nominally ambient conditions in the absence of added liquids or solvents. A more detailed description of various aspects of mechanochemical processing is provided by P. G. McCormick and F. H. Froes (e.g., "The Fundamentals of Mechanochemical Processing", Journal of Metals, vol. 50, 1998, pp 61–65) and E. M. Gutman (e.g., "Mechanochemistry of Materials", Cambridge International Science Publ., 1998) and references cited therein.

In the mechanical agitation process of the present invention, a predetermined amount of milling media, preferably chemically-inert, rigid milling media, is added to an essentially dry mixture containing manganese dioxide and conductive carbon powders prior to mechanochemical processing. By the term "chemically-inert milling media" as used herein is meant that the milling media does not react chemically with any of the components of the powder mixture. Typically, the weight ratio of the powder mixture to the milling media can range from about 1:3 to 1:10. The powder mixture including milling media is subjected to mechanical agitation, for example, in a suitable mixing or milling apparatus whereby the powder mixture is agitated in the presence of the milling media at ambient temperature, that is, without need of external heating. After the mechanical agitation process is completed, the milling media can be separated readily from the powder mixture using conventional powder separation techniques such as dry sieving through a suitable mesh screen.

The mechanical agitation process of the present invention can be accomplished most advantageously by a mixing or milling apparatus whereby compressive forces and shear stress can be applied repeatedly to the particles in the powder mixture. A suitable blending, mixing or milling apparatus can be selected from the following list of commercially available equipment: ball mill, sand, bead or pearl mill, basket mill, planetary mill, vibratory action ball mill, multi-axial shaker/mixer, stirred ball mill, rotary-tumbling mixer, and the like that include provision for the use of small milling media. The blending, mixing or milling apparatus also can contain one or more rotating shafts. One preferred mixing apparatus is a multi-axial shaker/mixer available commercially from Willy A. Bachofen A G Machinenfabrik under the tradename "Turbula". Acceptable rates of agitation and total agitation times are strongly dependent on the type and size of the milling apparatus as well as the type, size, and shape of the milling media, the weight ratio of the reaction mixture to the milling media, the chemical and physical properties of the powders comprising the reaction mixture, and other such factors that must be optimized empirically.

Suitable rigid, inert milling media can be fabricated from various materials including ceramic, glass, metal or polymeric compositions, in a particulate form. Preferred ceramic materials, for example, can be selected from a wide array of ceramics desirably having sufficient hardness and friability to enable them to avoid being chipped or crushed during milling and also having sufficiently high density. Suitable densities for milling media can range from about 3 to 15 g/cm$^3$. Preferred densities for milling media are greater than about 5 g/cm$^3$. Preferred ceramic materials can be selected from steatite, aluminum oxide, zirconium oxide, zirconia-silica, yttria-stabilized zirconium oxide, magnesia-stabilized zirconium oxide, silicon nitride, silicon carbide, cobalt-stabilized tungsten carbide, and the like. Preferred glass milling media are spherical (e.g., beads, balls), have a narrow size distribution, are durable, and comprise, for example, lead-free soda lime glass or borosilicate glass. Suitable metal milling media are typically spherical and generally have high hardness (i.e., RHC 60–70), extreme roundness, high wear resistance, and narrow size distribution and can include, for example, balls fabricated from type 52100 chrome steel, type 316 or 440C stainless steel or type 1065 high carbon steel. Preferred polymeric milling media are substantially spherical and can be selected from a wide array of polymeric resins having sufficient hardness and friability to avoid being chipped or crushed during milling, abrasion-resistance to minimize attrition thereby contaminating the product mixture, and freedom from other impurities such as metals, solvents, and residual monomers. Preferred polymeric resins, for example, can be selected from crosslinked polystyrenes, such as polystyrene crosslinked with divinylbenzene, styrene copolymers, polyacrylates such as polymethylmethacrylate, polycarbonates, polyacetals, vinyl chloride polymers and copolymers, polyurethanes, polyamides, high density polyethylenes, polypropylenes, polysulfones, and the like. The use of polymeric milling media to grind materials to very small particle size is disclosed, for example, in U.S. Pat. Nos. 5,478,705 and 5,500,331. Polymeric resins typically have densities ranging from about 0.8 to 3.0 g/cm$^3$. Polymeric resins having high density are preferred. Alternatively, the milling media can be composite particles comprising dense core particles having polymeric resin adhered thereon. Core particles can be selected from materials known to be useful as milling media, for example, glass, alumina, zirconium silicate, zirconium oxide, stainless steel, and the like. Preferred core materials have densities greater than about 2.5 g/cm$^3$.

Typically, milling media can be in the form of particles desirably having a variety of smooth, regular shapes, flat or curved surfaces, and lacking sharp or raised edges. For example, suitable milling media can have ellipsoidal, ovoid, spherical or right cylindrical shapes. Preferably, milling media have the form of beads, balls, spheres, rods, right cylinders, drums or radius-end right cylinders (i.e., right cylinders having hemispherical bases with the same radius as the cylinder). The milling media desirably have an effective mean particle diameter (i.e., "particle size") between about 0.1 and 10 mm. As used herein, the term "effective mean particle diameter" is defined as the mean diameter of the smallest circular hole through which a particle can pass freely. For example, the effective mean particle diameter of a spherical particle corresponds to the mean particle diameter and the effective mean particle diameter of an ellipsoidal particle corresponds to the mean length of the longest axis.

Preferred milling media are spherical ceramic media ranging in mean diameter from about 0.2 to 5 mm, more preferably from about 0.5 to 2 mm. Preferred density for spherical ceramic milling media is greater than about 4 g/cm$^3$. Suitable ceramic media can be chosen from medium density (i.e., 4.1 g/cm$^3$) fused zirconium oxide (e.g., 64% $ZrO_2$, 35% $SiO_2$, 1% $Al_2O_3$ by weight), high density (i.e., 5.5 g/cm$^3$) zirconium oxide stabilized with magnesia (e.g., 97% $ZrO_2$, 3% MgO), and very high density (i.e., 6.0 g/cm$^3$) zirconium oxide stabilized with yttria (e.g., 95% $ZrO_2$, 5% $Y_2O_3$). Preferred ceramic milling media are high density zirconium oxide balls or beads stabilized with magnesia or yttria. Suitable high density, yttria-stabilized zirconium oxide beads are available commercially, for example, from Glen Mills, Inc., under the tradename "VHD ZrO".

During the mechanical agitation process, the milling media facilitate transfer of mechanical energy in the form of rotation, translation, inversion or agitation generated by interaction of the milling media and the milling apparatus to the powders to be intermixed without significant bulk heating of the mixture. Motion imparted to the milling media can result in the application of shearing forces as well as multiple impacts or collisions having significant intensity between the milling media and particles of the powders to be intermixed. Collisions between particles of the powders to be intermixed are likewise promoted. The efficiency of transferal of mechanical energy from the milling media to the particles to be intermixed is influenced by a wide variety of processing parameters including: the type of milling apparatus; the particle/media collision frequency; the intensity of the forces applied; the size, density, shape, and composition of the milling media; the weight ratio of powder mixture to milling media; the duration of agitation; the physical properties of the particles to be intermixed; the atmosphere present during agitation; and others.

In one embodiment of the present invention, a non-heat-treated EMD is admixed with a total amount of graphite ranging typically from about 1 to 10 weight percent, preferably from about 2 to 8 weight percent, more preferably from about 2 to 4 weight percent of the total weight of the powder mixture. The powder admixture is combined with a suitable amount of inert milling media and is subjected to mechanical agitation at ambient temperature in air for a period of time typically ranging from about 0.15 to 12 hours, preferably from about 0.25 to 5 hours, more preferably from about 0.5 to 4 hours to form a homogeneous mixture. The weight ratio of the manganese dioxide and graphite admixture to the milling media typically ranges from about 1:2 to 1:10, preferably from about 1:3 to 1:5. Mechanical agitation is preferably accomplished without causing significant (e.g., greater than about 10%) particle size reduction of the manganese dioxide particles. Optimum activation times depend strongly on the physical properties of the particular powders and milling media, as well as the specific processing conditions. Mechanical activation of a mixture of manganese dioxide and graphite for an inadequate period of time (e.g., less than about 10 minutes) can result in non-homogeneity of the mixture. Prolonged mechanical agitation (e.g., >12 hours) is highly undesirable since the mean size of the manganese dioxide particles can be significantly decreased and the resistivity of cathodes formed therefrom greatly increased.

As an alternative to conductive carbon powders, it is theorized that metal particles or semiconductive metal oxide particles including those disclosed in U.S. Pat. No. 5,766,789, for example, can be substituted for conductive carbons in the method of the present invention. Suitable metal particles can include, for example, copper, silver, aluminum, zinc, and alloys thereof. Suitable semiconductive metal oxide particles can include, for example: antimony-doped or niobium-doped tin oxide; fluorine-doped tin oxide; niobium-doped titanium oxide; aluminum-doped zinc oxide; tin-doped indium oxide; silver-doped vanadium oxide; oxygen-deficient tin oxide, indium oxide or titanium oxide; and the like. Typically, suitable semiconductive metal oxide particles are nominally spherical in shape but could advantageously have an acicular (i.e., needle-like) or fibrous morphology as disclosed in U.S. Pat. No. 5,766,789.

It is theorized further that the inert milling media of the mechanical agitation process of this invention can be substituted by ceramic or polymer-coated particulate ferromagnetic elements to form an admixture with the manganese dioxide and conductive carbon powders. Kinematic motion can be imparted to the magnetic elements by means of the application of a rotating or oscillating bipolar magnetic field of sufficient intensity such that the powder mixture is fluidized in the general manner disclosed in U.S. Pat. No. 6,037,019, incorporated herein by reference. The continuously changing motion of the magnetic elements in response to variations in the applied magnetic field causes multiple collisions of the magnetic elements with the manganese dioxide and conductive carbon particles as well as the manganese dioxide particles with the conductive carbon particles. Such collisions can serve to transfer mechanical energy to the mixture of particles in the same manner as described hereinabove for mixtures mechanically agitated with milling media by the method of this invention.

In another embodiment, the present invention features inclusion of a cathode in an alkaline cell wherein the cathode includes manganese dioxide and conductive carbon particles, preferably comprising graphite or a mixture of graphites, homogeneously intermixed by the method of this invention. After the manganese dioxide and conductive carbon powders have been mixed by mechanical agitation with the milling media, the milling media are removed, aqueous electrolyte solution, preferably aqueous potassium hydroxide solution, optionally added, and the cathode formed.

Representative zinc/manganese dioxide alkaline primary cells can be prepared having an anode comprising particulate zinc and a cathode comprising predominantly manganese dioxide. The cathode comprises solid manganese dioxide and graphite particles intermixed by the mechanical activation process of this invention. An optional polymeric binder such as polyethylene, can be present in a small quantity (e.g., $\leq 1$ wt %). Such cathodes when included in alkaline cells provide improved discharge performance compared to cathodes having conventional amounts (i.e., >5 wt %)) of graphite.

Greater alkaline cell service life, particularly at low discharge rates (e.g. less than 0.5 Watt, e.g. between about 1 and 500 milliamp drain) can be obtained when cathodes are formed from mixtures of manganese dioxide and graphite treated by the mechanical activation process of this invention regardless of the total amount of graphite present for example, typically between about 1 and 10 weight percent, preferably between about 2 and 4 weight percent of the total cathode mixture. An improvement in cell performance can be obtained regardless of whether the particulate graphite is natural graphite, synthetic graphite, expanded graphite or any mixture thereof. Further, when the mechanical activation process of this invention is used to prepare a cathode mixture comprising manganese dioxide, graphite, and an optional polyethylene binder, the weight percentage of total graphite in the cathode also can be reduced. Comparable cell performance, particularly in high power applications (e.g. between about 0.5 and 2.0 Watt, more typically between about 0.5 and 1.5 Watt drain), can be achieved in an alkaline test cell with a lower total weight percentage of graphite in the cathode than a same-sized comparative cell, provided that the manganese dioxide and graphite mixture in the test cell is intermixed using the mechanical activation process of this invention. The graphite mixture in each cell must have the same composition (viz., the same percentage by weight of each type of graphite included therein) since replacing a portion of the natural graphite by expanded graphite will also provides improved cell performance.

Cathodes prepared by the mechanical agitation process of this invention can be of any structure, size, and shape and can be used with the same anode and electrolyte composition conventionally employed in zinc/manganese dioxide alkaline cells. An alkaline primary cell can take the form of a coin cell, button cell, cylindrical cell, prismatic cell, laminar cell or any other conventional cell geometry. The cell casing can be made from a metal such as nickel, nickel-clad or nickel-plated steel, stainless steel, aluminum or a polymeric material such as polyvinylchloride, polypropylene, polysulfone, acrylic acid-butadiene-styrene terpolymer (ABS) or polyamide. After the anode, cathode, separator, and electrolyte are added to the cell, the cell casing is tightly sealed to confine the electrolyte therein and inhibit infiltration by air into the cell.

Figure 2:
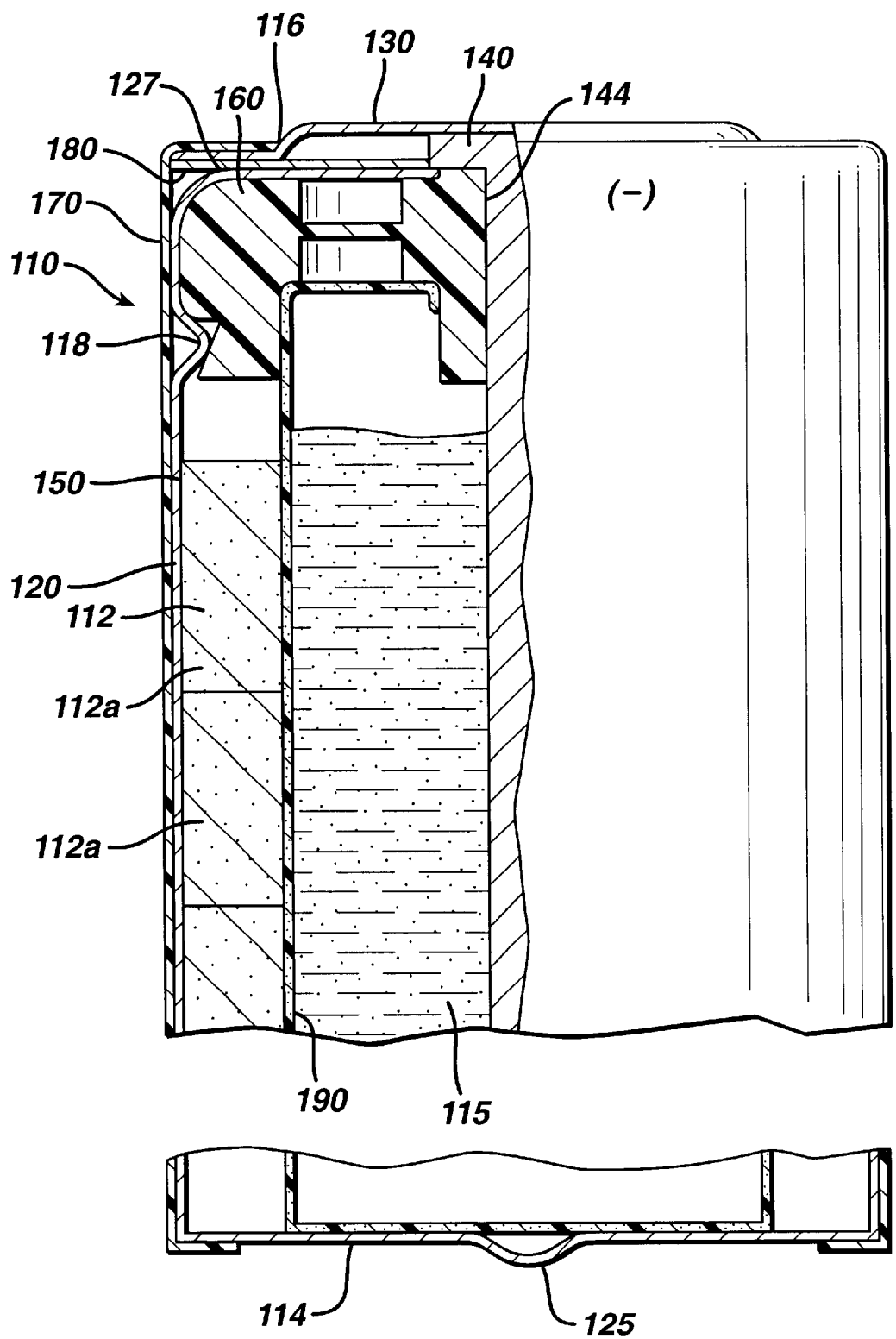
FIG. 2 is a drawing depicting a cylindrical alkaline primary battery.

A representative configuration for a typical cylindrical alkaline cell is depicted in FIG. 2. The Cell 110 comprises a cylindrical steel casing 120, having a closed end 114 and an open end 116. The cell is filled with a cathode 112 comprising manganese dioxide, and an anode 115 comprising zinc and electrolyte. The aqueous electrolyte comprises a conventional mixture of KOH, zinc oxide, and gelling agent. The anode material 115 can be in the form of a gelled mixture containing mercury free (zero-added mercury) zinc alloy powder. That is, the cell has a total mercury content less than about 50 parts per million parts of total cell weight, preferably less than 20 parts per million parts of total cell weight. The cell also preferably does not contain any added amounts of lead and thus is essentialy lead-free, that is, the total lead content is less than 30 ppm, desirably less than 15 ppm of the total metal content of the anode. Such mixtures can typically contain aqueous KOH electrolyte solution, a gelling agent (e.g., an acrylic acid copolymer available under the tradename CARBOPOL C940 from B. F. Goodrich), and surfactants (e.g., organic phosphate ester-based surfactants available under the tradename GAFAC RA600 from Rhône Poulenc). Such a mixture is given only as an illustrative example and is not intended to restrict the present invention. Other representative gelling agents for zinc anodes are disclosed in U.S. Pat. No. 4,563,404.

The cathode 112 desirably has the following composition: Electrolytic manganese dioxide (87–93 wt %), total graphite (2–6 wt %), and a 7–10 N aqueous KOH solution having a nominal KOH concentration of about 30–40 weight percent (5–7 wt %); and optional polyethylene binder (0.1 to 0.5 wt %). Such cathode mixtures are intended only to be illustrative and are not intended to restrict this invention.

The anode material 115 comprises: 62 to 69 wt % of zinc alloy (99.9 wt % zinc containing indium) powder; 35–40 wt % of aqueous KOH electrolyte solution (containing about 2 wt % ZnO in addition); 0.5 to 2 wt % of a cross linked acrylic acid polymer gelling agent (e.g., CARBOPOL C940 available from B. F. Goodrich); 0.01 to 0.5 wt. % of a hydrolyzed polyacrylonitrile grafted unto a starch backbone (e.g., Waterlock A-221 available from Grain Processing Co.; and about 50 ppm of a dionyl phenol phosphate ester surfactant (e.g., RM-510 available from Rhône-Poulenc). The average particle size of the zinc alloy powder is desirably between about 30 and 350 micron. The bulk density of the zinc alloy powder in the anode (viz., "anode porosity") is between about 1.75 and 2.2 grams zinc per cubic centimeter of anode. The percent by volume of electrolyte solution in the anode is between about 69.2 and 75.5 percent by volume of the anode.

The cathode 112 can be supplied in the form of a series of compacted annular pellets 112a. The anode and cathode are separated by an ion porous separator 190. The separator 190 can be a conventional ion porous separator comprising an inner layer of nonwoven material of cellulosic (rayon) and polyvinylalcohol fibers and outer layer of cellophane. After Cell 110 is filled, an insulating plug 160 is inserted into open end 116. Insulating plug 160 can be of polypropylene, talc filled polypropylene, sulfonated polyethylene or nylon. The plug 160 is preferably snap fitted around circumferential step 118 as shown in FIG. 2 so that the plug locks in place into the open end 116. The peripheral edge 127 of casing 120 is crimped over the top of insulating plug 160. A paper insulating washer 180 is applied over the crimped peripheral edge 127 of casing 120. Insulating washer 180 can be a polyethylene coated paper washer. A terminal end cap 130 is welded to the head of current collector 140. An elongated current collector 140 is then inserted (force fitted) into aperture 144 of insulating plug 160 so that end cap 130 comes to rest against insulating washer 180. Current collector 140 can be selected from a variety of known electrically conductive metals found to be useful as current collector materials, for example, brass, tin plated brass, bronze, copper or indium plated brass. Conventional asphalt sealant can be applied around the current collector 140 before it is inserted into aperture 144. A film label 170 is applied around casing 120. The terminal end cap 130 becomes the negative terminal of alkaline Cell 110 and pip 125 at the closed end of casing 114 becomes the positive terminal. The cell can be balanced in the conventional manner so that the mAmp-hr capacity of $MnO_2$ (based on 370 mAmp-hr per gram $MnO_2$) divided by the mAmp-hr capacity of zinc alloy (based on 822 mAmp-hr per gram zinc alloy) is about 1.

The cylindrical alkaline Cell 110 shown in FIG. 2 can be a AA-size cell but is not intended to be restricted to any particular size. Thus, the present invention also is readily applicable to AAAA, AAA, C and D size cylindrical alkaline cells as well as button-type alkaline cells of nominally any size or shape. Alkaline Cell 110 is also not intended to be restricted to any particular alkaline cell chemistry. Such representative chemistries, for example, are disclosed in U.S. Pat. No. 5,401,590, incorporated herein by reference. Although the present invention is principally directed toward primary alkaline cells, the anode and cathode chemistries can be adjusted so that the cells can become secondary (rechargeable) cells as is well known in the battery art.

A zinc/manganese dioxide alkaline cell also can be fabricated in the form of a button or coin cell. The low rate discharge performance data reported herein were obtained using a button cell embodiment as shown in FIG. 1. The cathode 70 in the button cell 10 desirably has the following composition: 87–93 wt % of electrolytic manganese dioxide (e.g., Trona D from Kerr-McGee), 2–6 wt % (total) of graphite, 5–7 wt % of a 7–10 Normal aqueous KOH solution having a KOH concentration of about 30–40 wt %; and 0.1 to 0.5 wt % of an optional polyethylene binder. Such cathode mixtures are intended only to be illustrative and are not intended to restrict this invention.

The anode material 50 comprises: Zinc alloy powder 62 to 69 wt % (99.9 wt % zinc containing indium), an aqueous KOH solution comprising 38 wt % KOH and about 2 wt % ZnO; a cross-linked acrylic acid polymer gelling agent available commercially under the tradename "CARBOPOL C940" from B. F. Goodrich (e.g., 0.5 to 2 wt %) and a hydrolyzed polyacrylonitrile grafted onto a starch backbone commercially available commercially under the tradename "Waterlock A-221" from Grain Processing Co. (between 0.01 and 0.5 wt. %); dionyl phenol phosphate ester surfactant available commercially under the tradename "RM-510" from Rhone-Poulenc (50 ppm). The zinc alloy average particle size is desirably between about 30 and 350 micron. The bulk density of the zinc in the anode (anode porosity) is between about 1.75 and 2.2 grams zinc per cubic centimeter of anode. The percent by volume of the aqueous electrolyte solution in the anode is between about 69.2 and 75.5 percent by volume of the anode.

The separator 60 can be a conventional ion porous separator consisting of an inner layer of a nonwoven material of cellulosic (rayon) and polyvinylalcohol fibers and an outer layer of cellophane. Such a material is only illustrative and is not intended to restrict this invention.

In the button cell 10 shown in FIG. 1, a disk-shaped cylindrical housing 30 is formed having an open end 32 and a closed end 38. Housing 30 is formed from nickel-plated steel. An electrical insulating member 40, preferably a cylindrical member having a hollow core, is inserted into housing 30 so that the outside surface of insulating member 40 abuts and lines the inside surface of housing 30. Alternatively, the inside surface of housing 30 can be coated with a polymeric material that solidifies into insulator 40 abutting the inside surface housing 30. Insulator 40 can be formed from a variety of thermally stable insulating materials, for example, nylon or polypropylene.

The cathode mixture comprising EMD, graphite, and optionally, a polymeric binder is prepared as described hereinabove. The graphite can be natural crystalline graphite, synthetic graphite, expanded graphite or any mixture thereof. Some aqueous alkaline electroyte optionally can be added to the dry cathode mixture to assist in forming the cathode 70. The cathode 70 is applied as a layer or a pressed disk abutting the inside surface of the closed end 38 of housing 30. The separator sheet 60 is placed overlying cathode 70. Additional aqueous electrolyte can be added so that electrolyte fully penetrates through separator sheet 60 and cathode 70. A layer of anode mixture 50 comprising particulate zinc, aqueous KOH electrolyte solution (35–40 wt % KOH and 2 wt. % ZnO), and gelling agent is applied to the separator sheet 60. The anode cover 20, formed preferably of nickel-plated steel, is inserted into the open end 32 of housing 30. An anode current collector 15 comprising a sheet of brass, tin-plated brass, bronze, copper or indium-plated brass can optionally be welded to the inside surface of anode cover 20. Peripheral edge 35 of housing 30 is crimped over the exposed insulator edge 42 of insulating member 40. The peripheral edge 35 bites into insulator edge 42 closing housing 30 and tightly sealing the cell contents therein. The anode cover 20 also functions as the negative terminal of the cell and the housing 30 at the closed end 38 functions as the cell's positive terminal.

Other features and advantages of the invention will be readily apparent from the description of the preferred embodiments and from the claims. The following examples serve to illustrate the present invention.

EXAMPLE 1

A mixture containing 114.00 g EMD (e.g., Kerr-McGee Trona D) and 6.00 g flaky, natural graphite (e.g., Naçional de Grafite MP-0702X) was combined with 500 g of 1 mm diameter yttria-stabilized zirconium oxide milling media in a 250 ml polypropylene bottle that was placed in a Turbula mixer/shaker and agitated at nominally 90 rpm for various periods of time. Samples (5–20 g) of the mixture were removed after 3, 30, 60, 120, and 300 minutes of agitation, corresponding to Examples 1a–e, respectively. Milling media were separated from the mixtures by sieving. Particle size distributions, BET specific surface areas, total pore volumes, average pore diameters, and incremental pore size distributions were determined for the mixtures agitated for 3, 60, and 300 minutes, corresponding to Examples 1a, 1c, and 1e, respectively. Values for average particle size, BET surface area, total pore volume, and average pore diameter are given in Table 1.

TABLE 1

| Sample | Mixing Time (min) | BET SSA ($m^2/g$) | Average Particle Size, $D_{50}$ ($\mu m$) | Total Pore Volume (cc/g) | Average Pore Diam. (Å) |
|---|---|---|---|---|---|
| Comp. Ex. 1 | 2 | 29.9 | 26.9 | 0.0452 | 60.6 |
| Example 1a | 3 | 27.9 | 25.4 | 0.0460 | 66.0 |
| Example 1c | 60 | 32.1 | 30.6 | 0.0535 | 66.6 |
| Example 1e | 300 | 32.0 | 61.6 | 0.0864 | 108.0 |

In order to determine the effect of the mixing process of the present invention on EMD particle size and microstructure, SEM micrographs were obtained for the mixtures of Examples 1a, 1c, and 1e after milling media were removed but before cathode disks were pressed at nominal magnifications of 50, 200, 500, and 1000×. SEM micrographs at 200× magnification of samples of the mixtures of Examples 1a, 1c, and 1e are shown in FIGS. 3.2, 3.3, and 3.4, respectively. For comparison, an SEM micrograph at 200× magnification of a mixture comprising 95 wt % EMD and 5 wt % flaky, natural graphite prepared by blending the components in a high-speed laboratory blade mill for about 2 minutes (e.g., Comparative Example 1) is shown in FIG. 3.1.

The micrographs of FIGS. 3.1, 3.2, and 3.3 show the presence of some relatively large EMD particles (viz., ≧100 microns). The large EMD particles in the micrograph of FIG. 3.3 appear to have more rounded edges than those shown in the micrographs of FIG. 3.1 or 3.2. It is conjectured that this could result from wear by the milling media. The micrograph of FIG. 3.4 for the mixture of agitated for 5 hours (i.e., Sample 1e) no longer appears to contain large EMD particles, having only particles with uniform average diameters of about 10–30 microns. It is hypothesized that mechanical strain accumulated during agitation was relieved by fracture of the larger EMD particles into smaller particles.

Disks were pressed from the mixtures of Examples 1a–e using a 12.5 mm hardened steel die set in a Carver laboratory press at an applied pressure of 10,000 pounds. The diameter and thickness of the pressed disks were measured to determine average density and assure uniformity of the samples. Specific resistivities for each mixture were obtained by measuring both sides of at least three pressed disks in several different locations on the surface by the four-point Van der Pauw-type DC method using a Loresta HP Model MCP-T410 resistivity meter. Specific resistivities as a function of mixing time are given in Table 2.

COMPARATIVE EXAMPLE 1

A mixture containing 9.50 g EMD and 0.50 g flaky, natural graphite (e.g., Nacional de Grafite MP-0702X) was placed in a Waring-type laboratory mixer having a mixing chamber volume of about 37 $cm^3$ and blended at the maximum speed for 2 minutes. Disks were pressed from the dry mixture, specific resistivity measured as described in Example 1, and the value given in Table 2. This value is more than twice that measured for the corresponding pressed disks of Example 1a. The average particle size, BET surface area, total pore volume, and average pore diameter for the dry mixture of Comparative Example 1 are given in Table 1.

COMPARATIVE EXAMPLE 2

A 250 ml polypropylene bottle containing a mixture of 95.00 g EMD and 5.00 g flaky, natural graphite (e.g., Nacional de Grafite MP-0702X) without milling media was placed in a Turbula mixer/shaker and shaken at 90 rpm. Samples (5–20 g) were removed after 60, 120, 300, and 1800 minutes of mixing, corresponding to Comparative Examples 2a–d, respectively. Disks were pressed from the mixtures of Comparative Examples 2a–d, the specific resistivities determined as in Example 1, and the values given in Table 2 as a function of mixing time.

Resistivities of disks pressed from dry mixtures processed by the method of the invention are consistently lower than that of disks pressed from the same compositions mixed by conventional methods. The high-speed laboratory mixer used to prepare the small dry mixtures of Comparative Example 1 provides a quality of mixing that is comparable to that achieved, for example, by an industrial stirred double-cone tumble blender (e.g., P-K Solids Processor, available from Patterson-Kelley Pocess Equipment Co.) or a plow-type mixer (e.g., Tilt-a-Mix available from Processall Inc.). The dry mixtures of Comparative Example 2 processed in a Turbula mixer/shaker without ceramic milling media were not mixed effectively even after extended processing times (e.g., 30 hours) as evidenced by the nearly constant resistivity values for disks pressed from the mixtures of Comparative Examples 2b–e. In fact, the resistivity value for disks pressed from the mixture of Comparative Example 2e blended for 30 hours was still greater than that for disks pressed from the mixture of Example 1a processed for only 3 minutes. However, in the case of the mixture of Example 1e mixed for 5 hours, the pressed disk resistivity was nearly double that for the mixture of Example 1d mixed for 2 hours. This increase may be related to the decrease in the average size of the EMD particles as shown in the SEM micrograph of FIG. 3.4.

EXAMPLE 2

A mixture containing 95.00 g EMD and 5.00 g expanded graphite (e.g., Chuetsu DCN-2) was combined with 500 g of 1 mm diameter yttria-stabilized zirconium oxide milling media in a 250 ml polypropylene bottle that was placed in a Turbula mixer/shaker and shaken at 90 rpm. Samples (5–20 g) were removed after 3, 10, 30, 60, 120, and 300 minutes of mixing, corresponding to Examples 2a–f, respectively. Mixtures were separated from the milling media by sieving. Disks were pressed from the dry mixtures, the specific resistivities determined as in Example 1, and the values given in Table 2 as a function of mixing time.

COMPARATIVE EXAMPLE 3

A mixture containing 47.50 g EMD and 2.50 g expanded graphite (e.g., Chuetsu DCN-2) was placed in a Waring-type laboratory mixer having a mixing chamber volume of about 37 cm$^3$ and blended at the maximum speed for 2 minutes. Disks were pressed from the dry mixture and specific resistivity measured as described in Example 1, and listed in Table 2. The average particle size, BET surface area, total pore volume, and average pore diameter for the dry mixture of Comparative Example 3 are given in Table 1.

Figure 4:
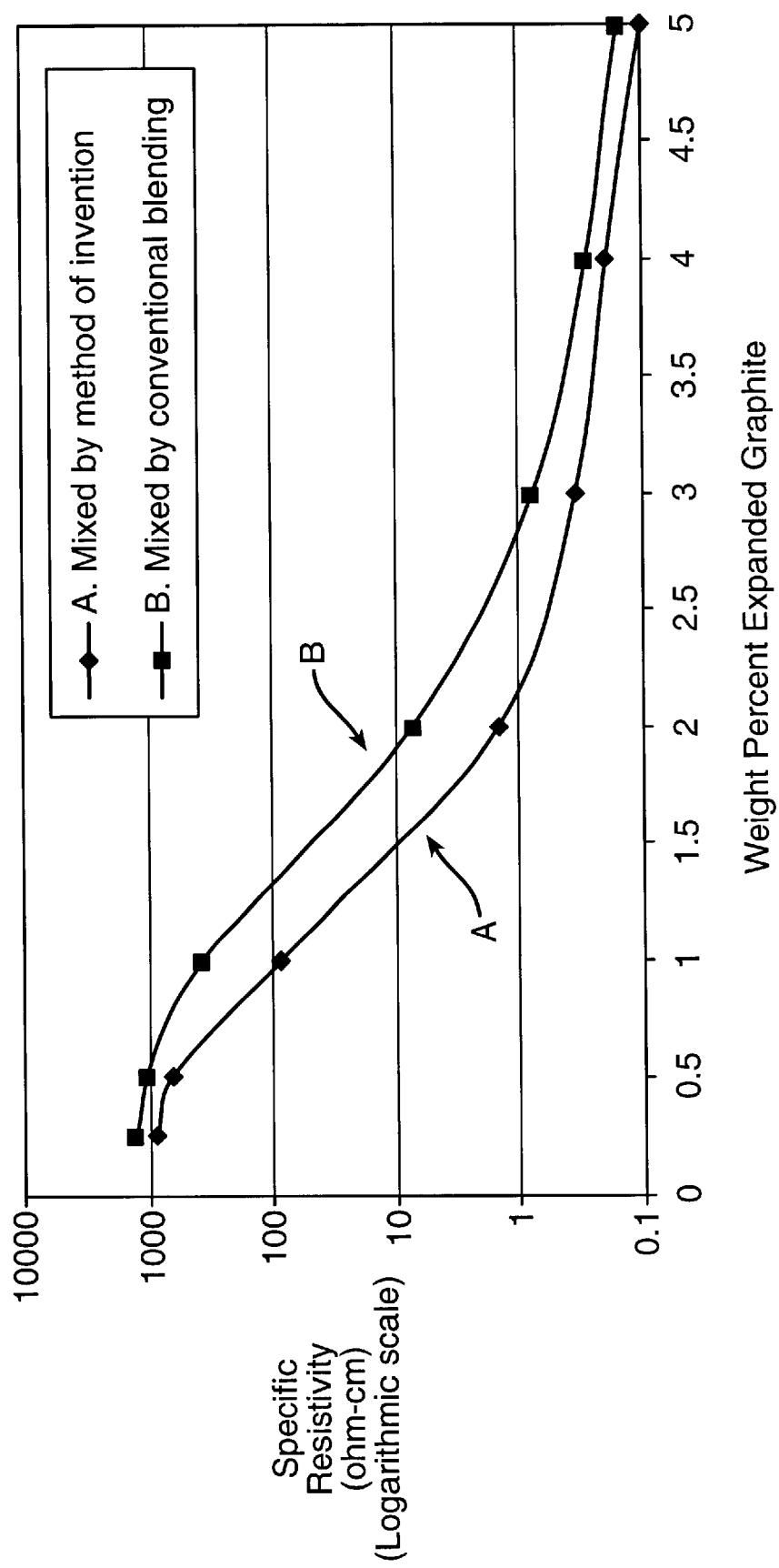
FIG. 4 is a plot showing the effect of weight percentage of expanded graphite (e.g., "DCN-2" from Chuetsu Graphite) on the value of specific resistivity for cathode disks pressed from mixtures of EMD and expanded graphite intermixed by: A. the mechanical activation process of this invention; B. a conventional blending process.

Substitution of 5 wt % of expanded graphite for 5 wt % flaky, natural graphite used in the mixtures of Example 1 provides even lower resistivity values for disks pressed from the mixtures of Example 2. Disks pressed from the mixture of Comparative Example 3 that was blended using a high-speed laboratory mill have higher resitivity values than disks pressed from the mixture of Example 2a. Typically, for mixtures comprising >5 wt % expanded graphite, either method of mixing can provide pressed disks having acceptable resistivity values. However, the advantage of the mixing method of the invention is evidenced clearly for expanded graphite levels of $\leq 3$ wt % as depicted in FIG. 4. The curve labeled "A" in FIG. 4 was obtained by measuring the resistivity values of disks pressed from mixtures containing various weight percentages of expanded graphite prepared by the method of the invention in the manner described in Example 2. The curve labeled "B" in FIG. 4 was obtained by measuring the resistivity values of disks pressed from mixtures containing various weight percentages of expanded graphite prepared by conventional blending in the manner described in Comparative Example 3.

EXAMPLE 3

A mixture containing 115.20 g EMD and 4.80 g expanded graphite (e.g., Chuetsu DCN-2) was combined with 500 g of 1 mm diameter yttria-stabilized zirconium oxide milling media in a 250 ml polypropylene bottle that was placed in a Turbula mixer/shaker and shaken at 90 rpm. Samples (5–20 g) were removed after 60, 120, and 180 minutes, corresponding to Examples 3a–c, respectively. Mixtures were separated from the milling media by sieving, disks pressed from the dry mixtures, specific resistivities determined as in Example 1, and the values given in Table 2 as a function of mixing time.

COMPARATIVE EXAMPLE 4

A mixture containing 76.80 g EMD and 3.20 g flaky, natural graphite (e.g., Nacional de Grafite MP-0702X) was combined with 400 g of 1 mm diameter yttria-stabilized zirconium oxide milling media in a 250 ml polypropylene bottle that was placed in a Turbula mixer/shaker and shaken at 90 rpm for 60 and 120 minutes, corresponding to Comparative Examples 4a and 4b, respectively. Mixtures were separated from milling media by sieving, disks pressed from the dry mixtures, specific resistivities determined as in Example 1, and the values given in Table 2 as a function of mixing time.

Resistivities of disks pressed from the mixtures of Example 3 containing 4 wt % expanded graphite are typically twice those of disks pressed from the corresponding mixtures of Example 2 containing 5 wt % expanded graphite. However, disks pressed from mixtures of Comparative Example 4 containing 4 wt % flaky, natural graphite substituted for the expanded graphite have resistivities 5–6 times greater than disks pressed from the mixtures of Example 3.

EXAMPLE 4

A mixture containing 116.40 g EMD, 3.60 g expanded graphite (e.g., Chuetsu DCN-2) was combined with 500 g of 1 mm diameter yttria-stabilized zirconium oxide milling media in a 250 ml polypropylene bottle that was placed in a Turbula mixer/shaker and shaken at 90 rpm. Samples (5–20 g) were removed after 60, 120, and 180 minutes, corresponding to Examples 4a–c, respectively. Mixtures were separated from the milling media by sieving, disks pressed from the dry mixtures, specific resistivities determined as in Example 1, and the values given in Table 2 as a function of mixing time.

COMPARATIVE EXAMPLE 5

A mixture containing 116.40 g EMD and 3.60 g flaky, natural graphite (e.g., Nacional de Grafite MP-0702X) was combined with 500 g of 1 mm diameter yttria-stabilized zirconium oxide milling media in a 250 ml polypropylene bottle that was placed in a Turbula mixer/shaker and shaken at 90 rpm. Samples (5–20 g) were removed after 60, 120, and 180 minutes of mixing, corresponding to Comparative Examples 5a–c, respectively. Mixtures were separated from milling media by sieving, disks pressed from the dry mixtures, specific resistivities determined as described in Example 1, and the values given in Table 2 as a function of mixing time.

Resistivities of disks pressed from the mixtures of Example 4 containing 3 wt % expanded graphite are typically 3–4 times those of disks pressed from the corresponding mixtures of Example 2 containing 5 wt % expanded graphite. However, resistivity values for disks pressed from the mixtures of Comparative Example 5 containing 3 wt % natural graphite substituted for the expanded graphite are 5–6 times greater than those for disks pressed from the mixtures of Example 4. This further demonstrates the advantage of using expanded graphite rather than natural graphite at very low graphite levels (viz., <3 wt %).

EXAMPLE 5

A mixture containing 117.00 g EMD, 3.00 g expanded graphite (e.g., Chuetsu DCN-2) was combined with 500 g of 1 mm diameter yttria-stabilized zirconium oxide milling media in a 250 ml polypropylene bottle that was placed in a Turbula mixer/shaker and shaken at 90 rpm. Samples (5–20 g) were removed after 60, 120, and 180 minutes, corresponding to Examples 5a–c, respectively. Mixtures were separated from the milling media by sieving, disks pressed from the dry mixtures, specific resistivities determined as in Example 1, and the values given in Table 2 as a function of mixing time.

COMPARATIVE EXAMPLE 6

A mixture containing 117.60 g EMD, 2.40 g expanded graphite (e.g., Chuetsu DCN-2) was combined with 500 g of 1 mm diameter yttria-stabilized zirconium oxide milling media in a 250 ml polypropylene bottle that was placed in a Turbula mixer/shaker and shaken at 90 rpm. Samples (5–20 g) were removed after 60 and 120 minutes, corresponding to Comparative Examples 6a and 6b. Mixtures were separated from the milling media by sieving, disks pressed from the dry mixtures, specific resistivities determined as in Example 1, and the values given in Table 2 as a function of mixing time.

Further decreasing the expanded graphite level to 2 wt % results in resistivity values for disks pressed from mixtures of Comparative Example 6 that are 4–5 times those for disks pressed from mixtures of Example 4. Such values are unsuitable for cathodes for alkaline primary cells. However, by increasing the expanded graphite level by 25% to 2.5 wt %, resistivity values for disks pressed from mixtures of Example 5 can be decreased to only twice those of Example 4.

EXAMPLE 6

A mixture containing 116.40 g EMD, 1.20 g flaky, natural graphite (e.g., Nacional de Grafite MP-0702X), and 2.40 g expanded graphite (e.g., Chuetsu DCN-2) was combined with 500 g of 1 mm diameter yttria-stabilized zirconium oxide milling media in a 250 ml polypropylene bottle that was placed in a Turbula mixer/shaker and shaken at 90 rpm. Samples were removed after 60, 120, 180, and 300 minutes, corresponding to Examples 6a–d, respectively. Mixtures were separated from the milling media by sieving, disks pressed from the mixtures and specific resistivities determined as in Example 1 with the values given in Table 2 as a function of mixing time.

EXAMPLE 7

A mixture containing 116.40 g EMD, 1.80 g flaky, natural graphite (e.g., Nacional de Grafite MP-0702X), and 1.80 g expanded graphite (e.g., Chuetsu DCN-2) was combined with 500 g of 0.5 mm diameter yttria-stabilized zirconium oxide milling media in a 250 ml polypropylene bottle that was placed in a Turbula mixer/shaker and shaken at 90 rpm. Samples were removed after 120, 180, and 300 minutes, corresponding to Examples 7a–c, respectively. Mixtures were separated from the milling media by sieving, disks pressed from the dry mixtures and the specific resistivities determined as in Example 1 with the measured values given in Table 2 as a function of mixing time.

Another method for decreasing expanded graphite level to 2 wt % or less is to combine expanded graphite with some natural graphite so as to increase the total graphite content to 3 wt % or greater. For example, resistivity values for disks pressed from mixtures of Example 6 comprising 2 wt % expanded graphite and 1 wt % natural graphite are somewhat less than those for disks pressed from the mixture of Example 5 containing 2.5 wt % expanded graphite only and less than twice that for disks pressed from the mixture of Example 4 containing 3 wt % expanded graphite only. The level of expanded graphite can be decreased to 1.5 wt % when used in combination with 1.5 wt % natural graphite as in the mixture of Example 7. The use of lower levels of expanded graphite provides the additional benefit of decreased cathode cost.

COMPARATIVE EXAMPLE 7

A mixture containing 118.80 g EMD, 1.20 g expanded graphite (e.g., Chuetsu DCN-2) was combined with 500 g of 1 mm diameter yttria-stabilized zirconium oxide milling media in a 250 ml polypropylene bottle that was placed in a Turbula mixer/shaker and shaken at 90 rpm for various periods of time. Samples (5–20 g) were removed after 60 and 120 minutes, corresponding to Comparative Examples 7a and 7b, respectively. Mixtures were separated from the milling media by sieving, disks pressed from the dry mixtures, specific resistivities determined as in Example 1, and the values given in Table 2 as a function of mixing time.

EXAMPLE 8

A mixture containing 116.40 g EMD, 3.60 g highly expanded graphite (e.g., Timcal E-BNB90) was combined with 500 g of 1 mm diameter yttria-stabilized zirconium oxide milling media in a 250 ml polypropylene bottle that was placed in a Turbula mixer/shaker and shaken at 90 rpm. Samples were removed after 60 and 120 minutes, corresponding to Examples 8a and 8b. Mixtures were separated from the milling media by sieving, disks pressed from the dry mixtures, specific resistivities determined as in Example 1, and the values given in Table 2 as a function of mixing time.

EXAMPLE 9

A mixture containing 117.60 g EMD, 2.40 g highly expanded graphite (e.g., Timcal E-BNB90) was combined with 500 g of 1 mm diameter yttria-stabilized zirconium oxide milling media in a 250 ml polypropylene bottle that was placed in a Turbula mixer/shaker and shaken at 90 rpm. Samples were removed after 60, 120, and 180 minutes, corresponding to Examples 9a–c, respectively. Mixtures were separated from the milling media by sieving, disks pressed from the dry mixtures, specific resistivities determined as in Example 1, and the values given in Table 2 as a function of mixing time.

A more highly expanded graphite can be substituted for the expanded graphite of Example 2 in order to further decrease the total graphite level. For example, the resistivity values of disks pressed from the mixtures of Example 9 containing 2 wt % highly expanded graphite are less than half those for disks pressed from the mixtures of Comparative Example 6 containing 2 wt % of a less highly expanded graphite. Further, the resistivity values of disks pressed from mixtures of Example 8 containing 3 wt % highly expanded graphite are comparable to those for disks pressed from mixtures of Example 3 containing 4 wt % of a less highly expanded graphite. It is hypothesized that substitution by an even more highly expanded graphite could provide mixtures having 1 wt % or less expanded graphite that still provide pressed disks with adequate resistivity. Further, mixtures of various expanded graphites can be used alone or in combination with natural graphite in order to optimize cathode performance and cost.

COMPARATIVE EXAMPLE 8

A mixture containing 46.85 g EMD and 3.15 g flaky, natural graphite (e.g., Nacional de Grafite MP-0702X) was placed in a Waring-type laboratory blender having a mixing chamber volume of about 37 cm$^3$ and blended at the maximum speed for about 3 minutes. The composition of the mixture is similar to that of cathodes used in commercial AA alkaline cells. Disks were pressed from the dry mixture, the specific resistivity determined, and the value given in Table 2.

TABLE 2

| | Pressed Disk Specific Resistivity (ohm-cm) | | | | | | |
| --- | --- | --- | --- | --- | --- | --- | --- |
| | Mixing Time (min) | | | | | | |
| Sample | 2–3 | 30 | 60 | 120 | 180 | 300 | 1800 |
| Example 1 | 0.73 | 0.37 | 0.33 | 0.29 | — | 0.57 | — |
| Comp. Ex. 1 | 1.51 | — | — | — | — | — | — |
| Comp. Ex. 2 | 1.30 | — | 0.80 | 0.88 | — | 0.94 | 0.87 |
| Example 2 | 0.12 | 0.095 | 0.096 | 0.093 | — | 0.13 | — |
| Comp. Ex. 3 | 0.12 | — | — | — | — | — | — |
| Example 3 | — | — | 0.20 | 0.18 | 0.17 | — | — |

TABLE 2-continued

| | Pressed Disk Specific Resistivity (ohm-cm) | | | | | | |
|---|---|---|---|---|---|---|---|
| | Mixing Time (min) | | | | | | |
| Sample | 2–3 | 30 | 60 | 120 | 180 | 300 | 1800 |
| Comp. Ex. 4 | — | — | 1.03 | 1.06 | — | — | — |
| Example 4 | — | — | 0.35 | 0.31 | 0.385 | — | — |
| Comp. Ex. 5 | — | — | 2.90 | 1.75 | 1.95 | — | — |
| Example 5 | — | — | 0.59 | 0.59 | 0.65 | — | — |
| Example 6 | — | — | 0.54 | 0.53 | 0.57 | 0.64 | — |
| Example 7 | — | — | — | 1.32 | 0.67 | 1.00 | — |
| Example 8 | — | — | 0.215 | 0.19 | — | — | — |
| Example 9 | — | — | 1.56 | 0.60 | 0.70 | — | — |
| Comp. Ex. 6 | — | — | 1.5 | 1.3 | — | — | — |
| Comp. Ex. 7 | — | — | 86.1 | 93.7 | — | — | — |
| Comp. Ex. 8 | 0.46 | — | — | — | — | — | — |

EXAMPLE 10

Discharge capacities at low rate for cathode disks pressed from samples of the mixtures of Examples 3–8 and Comparative Examples 5–8 providing the lowest specific resistivities for pressed disks were evaluated using 635-type button cells (FIG. 1). Values obtained are compared with those for cathode disks pressed from cathode mixtures of Comparative Example 8 comprising EMD and 6.3 wt % flaky, natural graphite (e.g., Nacional de Grafite MP-0702X). The values for open circuit voltage (OCV) for fresh cells and the low-rate gravimetric discharge capacities (viz., mAhr/g) for cells discharged continuously at 6 mA to cut-off voltages of 1.1V and to 0.8V are given in Table 3. This corresponds to a nominal C/50 discharge rate (i.e., a rate at which the cell capacity is discharged in a period of 50 hours).

TABLE 3

| Cathode Mixture | Discharge Rate | OCV | Capacity to 1.1 V (mAhr/g) | Capacity to 0.8 V (mAhr/g) |
|---|---|---|---|---|
| Comp. Ex. 8 | C/100 | 1.612 | 188 | 239 |
| Example 3 | C/100 | 1.580 | 232 | 273 |
| Example 4 | C/100 | 1.587 | 217 | 266 |
| Comp. Ex. 8 | C/50 | 1.605 | 185 | 239 |
| Example 4 | C/50 | 1.583 | 191 | 246 |
| Example 5 | C/50 | 1.595 | 153 | 212 |
| Example 6 | C/50 | 1.596 | 176 | 232 |
| Example 8 | C/50 | 1.595 | 213 | 256 |
| Example 9 | C/50 | 1.600 | 177 | 234 |
| Comp. Ex. 5 | C/50 | 1.580 | 89 | 113 |
| Comp. Ex. 6 | C/50 | 1.590 | 89 | 120 |

EXAMPLE 11

Discharge performance at high rate for cathode pellets pressed from the mixture of Example 1d was determined in alkaline AA test cells and compared with that for cathode pellets pressed from a mixture similar to that typically used for commercial AA alkaline cells containing 6.3 wt % flaky, natural graphite. The cathode comprised 9.758 g of EMD, 0.68 g of non-expanded, flaky, natural graphite (e.g., Nacional de Grafite MP-0702X), about 0.4 g of 9N KOH solution, and about 0.3 wt % polyethylene binder (e.g., Coathylene HA-1681). The anode included about 4.5 g zinc particles, about 3.4 g of 36 wt % KOH, about 1260 ppm of an anionic surfactant (e.g., Rhône-Poulenc, RM-510) relative to the zinc, about 1.96 g 9N KOH (containing about 2 wt % dissolved zinc oxide), and about 1.6 wt % total gelling agent (e.g., Carbopol 940 or A221). The separator can be formed of one or two layers of non-woven, non-membrane material with one layer being disposed along a surface of the other. To minimize volume of the separator, each layer had a basic weight of about 54 g per square meter and a thickness of about 5.4 mils when dry and about 10 mils when wet. The anode also included about 3.17 g of aqueous 9N KOH containing about 2 wt % dissolved zinc oxide disposed in the cathode and anode as indicated hereinabove with the remainder included in the separator. A thin conductive layer containing a carbonaceous material (e.g., Acheson Graphite, EB0005) was disposed on the inner surface of the wall of the battery housing adjacent to the cathode.

The test cells and control cells were discharged at a continuous 1A rate to a cutoff voltage of 0.8 V. The total capacity of the test cells was comparable to that of the control cells (i.e., about 1.2 service hours). Re-balancing the test cells to fully utilize the additional internal volume resulting from the decreased graphite level would be expected to provide additional capacity compared to the control cells.

Although the present invention has been described with respect to specific embodiments, it should be recognized that variations are possible without departing from the concept of the invention. Thus, the invention is not intended to be limited to specific embodiments, but rather the scope of the invention is reflected by the claims and equivalents thereof.

What is claimed is:

1. A process for preparing a cathode mixture for an electrochemical cell comprising the steps of:
   (a) forming a mixture comprising milling media and an essentially dry reaction mixture, said reaction mixture comprising particulate manganese dioxide and conductive carbon, wherein the weight ratio of said reaction mixture to said milling media is between about 1:3 to 1:10;
   (b) mechanically agitating said reaction mixture with said milling media therein at ambient temperature to form a homogeneously intermixed product mixture without reducing the average particle size of said manganese dioxide by more than about 10 percent.

2. The process of claim 1 wherein said manganese dioxide comprises particulate electrolytic manganese dioxide (EMD) and aqueous electrolyte is added to said homogeneously intermixed product mixture after step (b).

3. The process of claim 1 wherein said reaction mixture comprising particulate manganese dioxide and conductive carbon comprises between about 1 and 10 percent by weight conductive carbon.

4. The process of claim 1 wherein said reaction mixture comprising particulate manganese dioxide and conductive carbon comprises between about 2 and 4 percent by weight conductive carbon.

5. The process of claim 1 wherein said conductive carbon comprises expanded graphite.

6. The process of claim 1 wherein said conductive carbon comprises expanded graphite having an average particle size in the range between 0.5 and 40 microns.

7. The process of claim 1 wherein said conductive carbon comprises an admixture of expanded graphite and a graphite selected from the group consisting of natural graphite and synthetic non-expanded graphite and any mixture thereof.

8. The process of claim 1 wherein said conductive carbon comprises a graphite selected from the group consisting of natural crystalline, and synthetic crystalline graphite, and any mixture thereof, wherein said graphite, before said mechanical agitation in step (b) has an average particle size in the range between 2 and 50 microns.

9. The process of claim 1 wherein said manganese dioxide is particulate manganese dioxide having an average particle size, before said mechanical agitation in step (b), in the range between 10 and 50 microns.

10. The process of claim 1 wherein said mechanical activation step is accomplished by agitating said reaction mixture with said milling media.

11. The process of claim 1 wherein said milling media comprise rigid, chemically inert particles that do not react with said reaction mixture during said mechanical activation step.

12. The process of claim 1 wherein said reaction mixture additionally comprises a polymeric binder.

13. The process of claim 1 wherein said milling media comprises a material selected from the group consisting of ceramic, glass, metallic, and polymeric materials.

14. The process of claim 1 wherein said milling media comprises particles in the shape of at least one of beads, spheres, cylinders, rods and radius-end cylinders, wherein said milling media particles have a mean effective diameter between 0.2 and 5 mm.

15. The process of claim 1 wherein said milling media have a density ranging from about 3 to 15 g/cm$^3$.

16. The process of claim 1 wherein said weight ratio of said reaction mixture to said milling media is between 1:4 and 1:6.

17. The process of claim 1 wherein said milling media comprise a ceramic material selected from the group consisting of steatite, aluminum oxide, zirconium oxide, zirconia-silica, yttria-stabilized zirconium oxide, magnesia-stabilized zirconium oxide, silicon nitride, silicon carbide, and cobalt-stabilized tungsten carbide.

18. The process of claim 1 wherein said reaction mixture is mechanically activated in step (b) by contacting said reaction mixture and said milling media therein with a mechanical apparatus selected from the group consisting of ball mill, planetary mill, stirred ball mill, vibrating ball mill, multi-axial shaker/mixer, and any combination thereof.

19. The process of claim 1 wherein said mechanical activation in step (b) is conducted for a period of time of from about 0.1 to 8 hours.

20. The process of claim 1 wherein said mechanical activation in step (b) is conducted for a period of time of from about 0.5 to 4 hours.

21. An alkaline electrochemical cell comprising a case; positive and negative terminals; an anode comprising zinc metal or a zinc alloy; an aqueous electrolyte; and a cathode comprising a homogeneous mixture of manganese dioxide and graphite, said homogeneous mixture made by the process of:
   (a) forming a mixture comprising milling media and an essentially dry reaction mixture, said reaction mixture comprising particulate manganese dioxide and graphite, wherein the weight ratio of said reaction mixture to milling media is between about 1:3 to 1:10;
   (b) mechanically agitating said reaction mixture with said milling media therein at ambient temperature to form said homogeneous mixture without reducing the average particle size of said manganese dioxide by more than about 10 percent.

22. The alkaline electrochemical cell of claim 21 further comprising:
   (c) separating said milling media from said reaction mixture after step (b) and subsequently adding aqueous electrolyte to said mixture.

23. The alkaline electrochemical cell of claim 21 wherein said mechanical activation is accomplished by agitating said reaction mixture with said milling media.

24. The alkaline electrochemical cell of claim 21 wherein said particulate manganese dioxide has been treated by contact with ozone gas prior to forming said mixture in step (a).

25. The alkaline electrochemical cell of claim 21 wherein said particulate maganese dioxide, before said mechanical agitation in step (b), has an average particle size between 10 and 50 microns.

26. The alkaline electrochemical cell of claim 21 wherein said reaction mixture comprising manganese dioxide and graphite comprises between about 1 and 10 percent by weight graphite.

27. The alkaline electrochemical cell of claim 21 wherein said reaction mixture comprising manganese dioxide and graphite comprises between about 2 and 4 percent by weight graphite.

28. The alkaline electrochemical cell of claim 21 wherein said graphite comprises expanded graphite.

29. The alkaline electrochemical cell of claim 21 wherein said graphite comprises an admixture of expanded graphite and a graphite selected from the group consisting of natural graphite and synthetic non-expanded graphite and any mixture thereof.

30. The alkaline electrochemical cell of claim 21 wherein said graphite comprises expanded graphite having an average particle size, before said mechanical agitation in step (b), in the range between 0.5 and 40 microns.

31. The alkaline electrochemical cell of claim 21 wherein said milling media is chemically inert in that it does not react with said mixture comprising manganese dioxide and graphite during said mechanical agitation step.

32. The alkaline electrochemical cell of claim 21 wherein said milling media comprises a material selected from the group consisting of ceramic, glass, metallic, and polymeric materials.

33. The alkaline electrochemical cell of claim 21 wherein said milling media comprises particles in the shape of at least one of beads, spheres, cylinders and radius-end cylinders, wherein said milling media particles have mean diameters between 0.2 and 5 mm.

34. The alkaline electrochemical cell of claim 21 wherein said milling media comprises yttria-stabilized zirconium oxide spheres.

35. The alkaline electrochemical cell of claim 21 wherein said mechanical agitation in step (b) is accomplished by agitating said reaction mixture and said milling media therein with a mechanical apparatus selected from the group consisting of ball mill, planetary mill, stirred ball mill, vibrating ball mill, multi-axial shaker/mixer, and any combination thereof.

36. The alkaline electrochemical cell of claim 21 wherein said mechanical agitation in step (b) is conducted for a period of time of from about 0.5 to 4 hours.

37. A process for treating manganese dioxide comprising the steps of:
   (a) forming a mixture comprising milling media and a dry reaction mixture, said reaction mixture comprising particulate manganese dioxide and conductive carbon, said conductive carbon selected from the group consisting of graphite, acetylene black, graphitized carbon fibers, carbon nanofibers and carbon nanotubules, and any mixture thereof, wherein the weight ratio of said reaction mixture to said milling media is between about 1:3 to 1:10;

(b) mechanically agitating said reaction mixture with said milling media therein at ambient temperature to form a homogeneous product mixture without reducing the average particle size of said manganese dioxide by more than about 10 percent.

38. An alkaline electrochemical cell comprising a case; positive and negative terminals; an anode comprising zinc metal or a zinc alloy; an aqueous electrolyte; and a cathode comprising a homogeneous mixture of particulate manganese dioxide and conductive carbon, said homogeneous mixture made by the process of:

(a) forming a mixture comprising milling media and an essentially dry reaction mixture, said reaction mixture comprising particulate manganese dioxide and conductive carbon, said conductive carbon selected from the group consisting of graphite, acetylene black, graphitized carbon fibers, carbon nanofibers and carbon nanotubules, and any mixture thereof, wherein the weight ratio of said reaction mixture to milling media is between about 1:3 to 1:10;

(b) mechanically agitating said reaction mixture with said milling media therein at ambient temperature to form a homogeneous product mixture without reducing the average particle size of said manganese dioxide by more than about 10 percent.

39. The alkaline electrochemical cell of claim 38 further comprising:

(c) separating said milling media from said reaction mixture after step (b) and subsequently adding aqueous electrolyte to said mixture.

* * * * *